Patented June 6, 1939

2,161,029

UNITED STATES PATENT OFFICE 2,161,029

FAT SUBSTITUTE AND METHOD OF MAKING

Henry Carl Eckrich and Herman J. Eckrich, Sr., Fort Wayne, Ind., assignors to Peter Eckrich & Sons, Inc., Kalamazoo, Mich., a corporation of Indiana No Drawing. Application August 18, 1937, Serial No. 159,709

5 Claims. (Cl. 99—123)

In the manufacture of prepared meats such for example as liver sausage, liver loaf, and other meat loaves and meat products, it is highly desirable to provide a coating which affords a thorough protection therefor. Fat has been used for that purpose but there are many difficulties and objections to its use including the difficulty in handling, cost, and lack of stability under various conditions such as temperature variations, tendency to rancidity, and the like.

The main objects of this invention are:

First, to provide a product which is highly satisfactory as a dip or coating for food products of the class indicated and other food products and which provides a continuous coating that is not easily ruptured or broken, is solid under atmospheric conditions, and is very attractive in appearance; further, a product which is wholesome and edible although not primarily designed or intended for that purpose.

Second, to provide a product adapted for use for the purposes indicated which has very high protective qualities and does not become rancid in the ordinary uses contemplated.

Third, to provide a method of making or producing a fat substitute of the character above indicated by which the material may be readily produced on a commercial scale without the aid of complicated machinery or apparatus.

Further objects pertaining to details and economies of our invention will definitely appear from the description to follow. The invention is defined in the claims.

In the manufacture of our product the ingredients may be considerably varied in proportion and it will be understood that the formulae and proportions given are set forth as formulae which will enable an effective practice of the method of our invention and production of a satisfactory product.

To 100 pounds of cold water we add 30 pounds of powdered dry gelatin. Preferably the water is stirred while the gelatin is added. The water and gelatin mixture is then heated to approximately 180 to 190 degrees by placing the container in a vat of water at that temperature and this is maintained until all of the gelatin has been dissolved. The liquid gelatin is then placed in a beater or agitator which is operated at high speed for about 2 minutes which produces a frothy condition throughout the gelatin. While in this condition and while continuing to agitate the gelatin we gradually add or pour into the container melted lard, cocoa-nut oil, vegetable oil or any oil or fat which will solidify when cold, in the proportions of about 3 pounds of fatty material to four pounds of the liquid gelatin. The fatty material is preferably at about 160 degrees when poured into the gelatin.

After the fatty material has been poured into the gelatin the beating or agitation is continued for approximately 2 minutes which ordinarily results in a homogeneous mixture. The mixture may then be placed in a container for storage and preferably cooled in a refrigerator at from 35 to 40 degrees. The temperatures indicated are Fahrenheit.

When cooled the product has the consistency approximating that of the white of a boiled egg, that is, an egg which has been boiled until the white is past the fluid or flowing state. The product is somewhat resilient, and where lard, for instance, is used the product is white. Certain fatty materials might result in a modification or change of color.

This material forms a very effective coating for meat products such as liver sausage, liver loaf, or any other meat loaf or meat product which it is desired to provide with a protective coating.

In applying the product is heated to a thick fluid condition and the product to be coated is dipped therein. Ordinarily a single dipping is sufficient for meat products such as indicated but second dippings may be had if a thicker coating is required. It is found that the coating is uniform and completely encases and seals the product, providing a tough covering therefor, although in practice, in packaging meats for instance, an outer cellulose casing is applied to protect the coating from dirt, to protect the package generally, and to comply with various meat packaging requirements.

A meat package embodying our product is illustrated in our application, Serial No. 159,668, filed August 18, 1937.

Our product has various uses other than those specifically mentioned and we do not wish to be understood as limiting ourselves to a meat dip or fat substitute for coating meats, although that was our primary aim in the development of our invention.

Having thus described our invention what we claim as new and desire to secure by Letters Patent is:

1. A product suitable for coating meat and other food products comprising gelatin and water in the approximate proportion of 1 to 3, and a fatty material which will solidify at atmospheric temperature, homogeneously combined and having a consistency approximating that of the white of a hard boiled egg, the approximate proportion of gelatine solution and fatty material being approximately 4 to 3.

2. The method of making a material suitable for coating meat and other food products which comprises the steps of dissolving gelatin in water in approximately the proportions of 1 pound of gelatin to 3 pounds of water, beating or agitating violently for approximately two minutes, adding thereto a melted fatty material which will solidify when cold in the proportion of 3 pounds of fatty material to 4 pounds of the liquid gelatin, and agitating violently for approximately two minutes.

3. The method of making a fat substitute suitable for coating food products which comprises the steps of dissolving gelatin in water in the proportions of approximately 3 pounds of the gelatin to 10 pounds of water, agitating to a frothy state, adding thereto an oleaginous material in the proportions of approximately 3 pounds of the oleaginous material to 4 pounds of liquid gelatin, and agitating to homogeneity.

4. The method of making a fat substitute which comprises the steps of adding 30 pounds of dry powdered gelatin to 100 pounds of cold water, heating until the gelatin has been dissolved, beating or agitating violently for approximately two minutes, adding slowly thereto while continuing the agitation lard heated to a temperature of approximately 160 degrees in the proportions of 3 pounds of lard to 4 pounds of liquid gelatin, agitating for approximately two minutes, and cooling at 35 to 40 degrees.

5. The method of making a fat substitute which comprises the steps of dissolving dry gelatin in water in the proportions of approximately 1 pound of dry gelatin to 3 pounds of water and heating to approximately 185 degrees, beating or violently agitating to a frothy state, adding thereto while continuing the agitation fatty material at a temperature of approximately 160 degrees and in the proportions of approximately 3 pounds of the fatty material to 4 pounds of the liquid gelatin, and continuing the agitation to homogeneity.

HENRY CARL ECKRICH.
HERMAN J. ECKRICH, Sr.